Patented Feb. 20, 1940

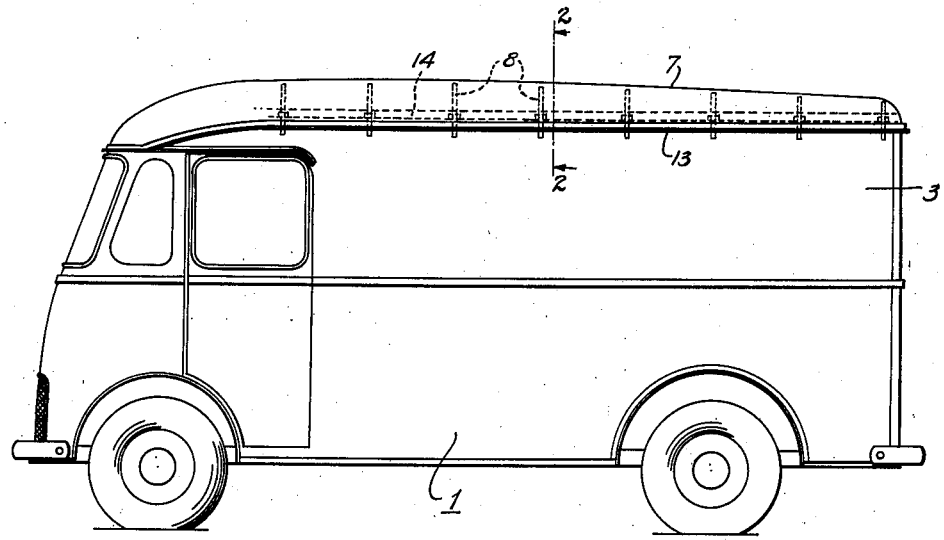
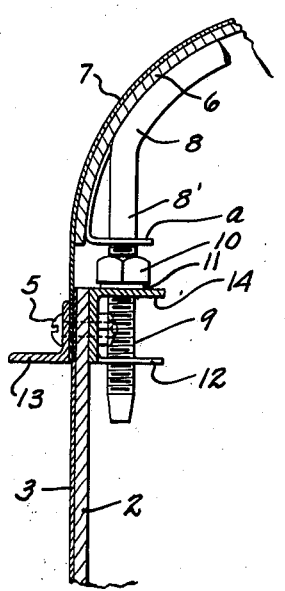
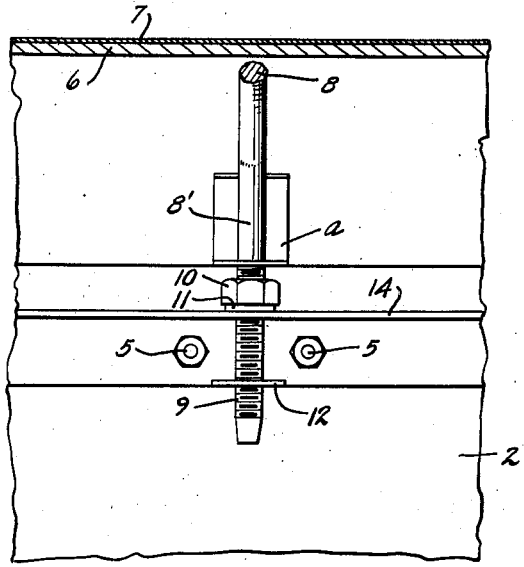
Fig. 1
Fig. 2
Fig. 3

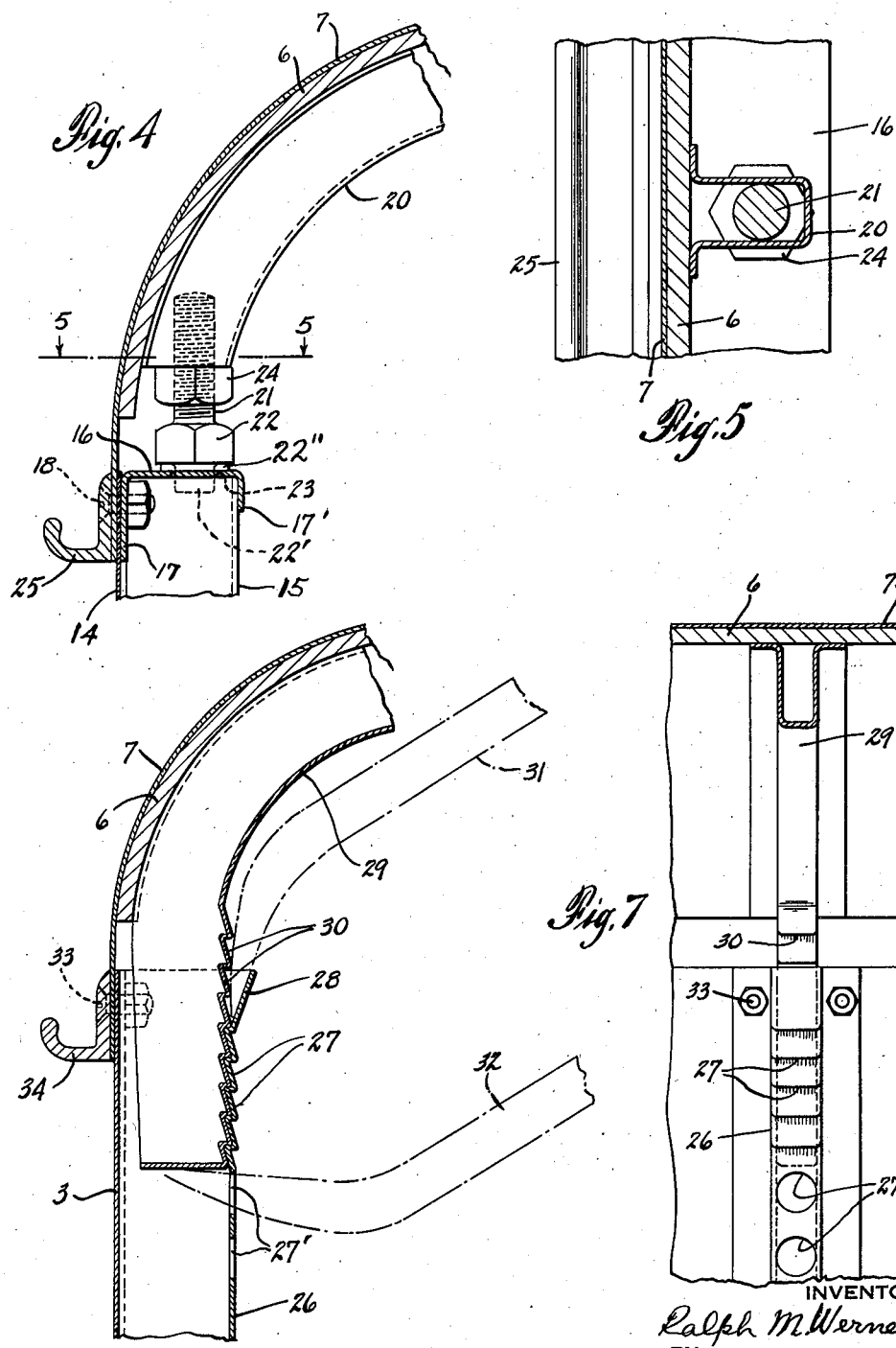

2,191,264

UNITED STATES PATENT OFFICE 2,191,264

ROOF SUPPORT FOR VEHICLE BODIES

Ralph M. Werner, Brooklyn, N. Y.

Application December 10, 1938, Serial No. 244,940

3 Claims. (Cl. 296—137)

This invention relates to the roof construction of vehicle bodies, more especially those of commercial and passenger vehicles, including trailers, and has for its particular objects the provision of roof-supporting members or bows which are adapted to be raised or lowered at will whereby they can be positively forced against the inner surface of the roof, thus eliminating any gaps or clearance between the roof and its supporting members and permitting the roof covering to be first properly positioned and thereafter drawn taut, whereby the roof can be perfectly fitted on the supporting members and caused to assume the desired shape and appearance and to receive the full support of the engaging supports. Other advantages are hereinafter set forth.

In the usual type of roof construction employed on commercial vehicles in particular, it is customary to draw down the roof covering over the roof-supporting members after said supporting members have been installed in their final position within the vehicle body, in an attempt to shape the covering and to eliminate any gaps or clearance as aforesaid between the same and said supporting members, this being especially true where the roof covering is preformed of steel or other materials. Such preformed roofs, however, often do not lend themselves to being so formed or shaped during installation.

My investigations have led to the discovery that if the supporting members for the roof, such as bows for example, are so mounted that they are susceptible of vertical adjustment upwardly as well as downwardly, it is possible to first install such roof-supporting members in a temporary position on the body wherein they lie somewhat below the ultimate level to which they are to be ultimately adjusted and to then apply the roof covering to the body without necessitating that the same be pulled down tightly over the supporting members, after which such supporting members can be forced upwardly into snug engagement with the roof completely across such supporting members.

My invention is fully set forth in the following description and drawings forming a part thereof, in which latter:

Figure 1 is a side elevation of a delivery truck, the roof of which is constructed in accordance with my invention;

Fig. 2 is a vertical section taken on the line 2—2 of Fig. 1;

Fig. 3 is a fragmentary, inside elevation of those parts illustrated in Fig. 2 that are visible from the inside of the body;

Fig. 4 is a vertical, fragmentary section, partly in elevation, and Fig. 5 is a horizontal section on the line 5—5 of Fig. 4, showing a modified form of roof construction;

Fig. 6 is a fragmentary vertical section showing a still further modification wherein the roof bows are adapted to be swung into and out of an adjusted positioned by means of special tools; and Fig. 7 is a fragmentary elevation from the inside of the vehicle of the construction illustrated in Fig. 6.

Referring to the drawings and construction shown therein, the reference numeral 1 designates the body of a delivery truck and 2 the longitudinal side wall panel thereof, the latter being covered by a layer 3 of light gauge sheet steel, fabric or other suitable material. A longitudinally extending reinforcing channel iron 4 is secured by means of bolts 5, arranged in pairs, to said side panel along the upper margin thereof. A roof member consisting of a reinforcing layer 6 of wood, composition board or sheet steel and an outer covering layer 7 of light gauge sheet steel, fabric or the like, which roof is of the appropriate shape to conform to the walls of the vehicle body to which it is to be applied, is supported by vertically adjustable carlines or bows 8 having vertical legs 8' that are threaded at their out ends 9 to receive adjusting nuts 10. Said channel iron 4 is provided with apertures of sufficient size to freely receive the threaded ends 9 of said bows and washers 11 are interposed on said legs between the angle iron 4 and the adjusting nuts 10. Apertured plates 12 are welded or otherwise secured to the angle irons 4, said plates serving as guides for the lower ends of said bows which loosely fit in the apertures therein. Angular supplemental supports a, which are welded to the vertical legs 8' of the bows and through which said threaded ends 9 project, serve to support the portions of the roof member immediately adjacent the vertical legs 8'. The said panel 2 has an angular drip molding 13 secured thereto by the said bolts 5 and which conceals the joint between the roof covering 7 and the side panel covering 3.

In the modification illustrated in Fig. 4, the reference numeral 14 designates the side wall of the body and 15 hollow metal posts supported on the floor of the vehicle which are positioned at intervals longitudinally thereof. An inverted channel iron 16 rests on the top of said posts, the inner wall 17 of said channel iron extending between the rear face of said posts and the inner face of the side panel 14 and the outer abbreviated wall 17' of said channel iron 16 snugly engages the front of the posts 15. Bolts 18 secure said posts and said channel iron to the side wall panel 14.

The roof member which is similar to that shown in Fig. 2 is supported by channel iron bows 20. Adjusting elements, each having a threaded upper end 21, an intermediate integral hexagonal shoulder 22, a plain lower end 22' and a washer 22" loosely carried thereby is threaded into a hexagonal nut 24 that is welded to the bottom of the bow 20 in such a position that the aperture of the nut registers with the bow channel as illustrated in Fig. 5. Said ends 23 of the adjusting elements project into apertures formed in the top of said channel iron 16, which are positioned at proper locations so as to correspond to the locations of said bows and to admit of said adjusting elements being in vertical alignment when positioned in such apertures and in the said nut 24 carried by the respective bows 20. A drip gutter 25 extends along the outside of the lower panel 14, the same being secured in position by the bolt 18 aforesaid and the same serves to cover the joint between the outer roof covering and said lower panel.

In the modification illustrated in Figs. 6 and 7, hollow metal posts 26 are positioned at intervals along the side walls 3 of the body, the same having a vertical series of ratchet-like teeth 27 projecting inwardly therefrom and also two tool-receiving apertures 27' formed on the inner wall thereof. The said posts are expanded inwardly of the vehicle body at the top thereof to form an inclined wall 28 which functions as hereinafter described. The bows 29, which are of flanged channel iron configuration, have depending legs which extend at a slight angle to the vertical axis of the posts 26, and these legs are provided with a series of ratchet-like teeth 30 which are adapted to cooperate with the teeth 27. Tools or crow-bars 31 and 32 having edged shaped ends are adapted, when positioned in the manner shown, to respectively forcibly separate the teeth 27 and 30 from engagement with each other and to admit of the adjustment of the bows 29 upwardly or downwardly within the metal post 26, it being, of course understood that the legs of bows preferably have sufficient spring to admit of the teeth being readily pried apart, as aforesaid, when applying pressure to the outer end of tool 31 when the same is projecting into the recess behind the inclined end 28 of said posts 26, whereby the legs of the bows 29 can be forced rearwardly within the post 26 a sufficient distance to admit of the disengagement of the teeth 27 and 30 and of the upward adjustment of the bows 29 by inserting crow-bar 32 into one of the recesses 27, as shown in Fig. 6, and then applying downward pressure to the outer end thereof. Bolts 33 serve to secure the flanges of the channel iron posts 26 to the side wall 3, to the roof covering 7 and to a drip gutter 34 which extends longitudinally of the side wall and covers the joint between the roof covering 7 and said side wall.

In mounting the roof on the body, when the construction shown in Fig. 2 is employed, the bows 8 are mounted with their threaded vertical portions 9 projecting through the apertures adapted to receive the same in the angle iron 14 and guide plate 12, the nut 10 and the washer 11 being mounted on said threaded portions 9 above said angle iron 14. The roof member is then positioned on said bows, molding 13 and the outer covering 7 are secured in the position shown in Fig. 2 by the bolt 5 and then the nut 10 is screwed downwardly on the threaded portion 9, thereby forcing the bows 8 upwardly into intimate engagement with the roof member and the same are caused to exactly conform with each other. Whenever thereafter it is desired to close any gaps that may develop between the roof member and the bows, it is obvious that the nuts may be screwed down to eliminate any such gap or to draw the roof covering taut in the event the same has sagged or developed wrinkles in the outer covering 7.

The mounting of the roof member on the body walls when the construction shown in Fig. 4 is employed, is a similar operation to that just described, except that the adjusting elements are first threaded into the bows and then the same are mounted so that the lower ends 22' are projecting into the aperture 23 in the angle iron 16 which are in registry therewith and then after the roof covering 7 and the gutter 25 have been secured in position by the bolt 18, the adjusting elements are screwed clockwise when viewed from below into the nut 24 carried by the bows 20, thereby elevating the bows into the desired position against the roof member and shaping the latter to conform to said bows thereby eliminating any possible gaps or clearance between the bows and the roof member completely across the entire length of said bows.

When employing the construction shown in Fig. 6, the bows 29 are positioned with the teeth 30 thereof in engagement with the teeth 27 of the post 26, but said bows are dropped to a level which admits of the ready application of the roof covering thereto. Thereupon and while the bows are supporting said roof member in its approximate position, the gutters 34 and the outer covering 7 are secured to the side wall 3 by the bolt 33 and then the roof iron or crow-bar 32 is inserted through a hole 27 so as to engage the lower end of the bolt 29 and by applying pressure to the outer end of the roof iron 32, the bows are elevated until the same intimately engage the roof and properly shape the same to conform to the shape of the bows, whereupon the co-operating teeth of the bows and posts 26 being in engagement with each other, due to the spring tendency of the slightly inclined lower ends of the bows 29 which effects automatic engagement between the teeth whenever their respective shoulders are in a superimposed relation such as shown in Fig. 6, the said roof iron 32 can be withdrawn without any appreciable settling movement of the bows 29. To effect the downward adjustment of said bows when desired, it is necessary to insert the wedge-like end of the roof iron 31 behind the inclined wall 28 of the post 26 and in front of the teeth 30 of a bow 29 inserted therein and thereupon by applying pressure to the outer end of said roof iron, the teeth 30 can be sprung out of engagement with the teeth 27 of the posts whereupon the bows 29 can be dropped while supported to the extent desired by the roof iron 32 which is held against the bottom of the bows 29 that is being adjusted, until said bow has been dropped to the desired level.

My improved construction renders the mounting of the roof on the vehicle body very easy to accomplish, besides expediting the time required for such mounting, as compared with that ordinarily required where the roof covering is pulled down over the bows after application thereto, rather than the bows being forced upwardly against the roof covering as occurs when following the procedure herein outlined. As a result of the employment of my improved construction, the roof covering is easily reformed or reshaped to conform exactly to the shape of the supporting bows, all as above explained. In addition to these advantages the vehicle body constructed in the manner herein described, is substantially more rigid and less liable to become distorted under strain, since the roof covering is effectively locked in position and due to the intimate engagement between the bows and the roof covering the entire vehicle body is stiffened to a remarkable degree.

Various modifications of the construction disclosed herein may be made without departing from the spirit of my invention as embraced within the scope of the appended claims.

Having thus described my invention, what I claim and desire to obtain by United States Letters Patent is:

1. In a vehicle body, the sub-combination comprising a roof covering, supporting carlines, each having descending opposing legs, positioned at intervals beneath said roof, the opposing depending legs of each of the carlines being substantially rectilineal longitudinally thereof but being inclined slightly towards each other and each leg having a longitudinal series of ratchet teeth on the innermost face thereof, hollow supporting posts adapted to freely receive said legs, each post having an oblique top marginal portion on the inner wall thereof for the reception of a crow-bar and said posts each having a vertical series of ratchet teeth on the inner wall thereof which are similar to the ratchet teeth on said carlines and adapted to cooperate therewith, and means on said posts for admitting of the insertion of the end of a crow-bar beneath the lower end of a carline when mounted in a supporting post.

2. In a vehicle body, the combination comprising opposing side and end walls and a roof spanning the same, a plurality of hollow posts mounted within and secured to the body, the same being positioned at intervals along the side walls thereof and each being provided with a terminal series of internal ratchet teeth and having an aperture formed therein to receive the end of a crow bar, roof supporting members spaced from each other and intimately engaging said roof and spanning the space between the opposing side walls of the body, the opposing ends of each roof supporting member projecting into opposing posts of the plurality of posts mounted within said body and each of said ends having a series of ratchet teeth thereon in intimate engagement with the ratchet teeth of the particular post into which such end projects and said roof supporting members having the ends thereof projecting at an oblique angle with respect to the longitudinal axes of the posts into which the same project.

3. In a vehicle body, the combination comprising opposing side and end walls and a roof spanning the same, a plurality of hollow posts mounted within and secured to the body, the same being positioned at intervals along the side walls thereof and each having outwardly inclined walls adjacent the top thereof adapted to serve as a fulcrum for a crow bar when the latter is resting upon such inwardly inclined wall and also having a series of ratchet teeth carried thereby which extend below such inclined wall portion of the post as well as having an aperture formed therein distant from the top of said post to receive the end of the crow bar, roof supporting members spaced from each other and intimately engaging said roof and spanning the space between the opposing side walls of the body, the opposing ends of each roof supporting member projecting into opposing posts of those mounted within said body and each of said ends having a series of ratchet teeth thereon in intimate engagement with the ratchet teeth of the particular post into which such end projects and said roof supporting members having the ends thereof projecting at an oblique angle with respect to the longitudinal axes of the posts into which the same project.

RALPH M. WERNER.